Patented May 11, 1948

2,441,523

UNITED STATES PATENT OFFICE 2,441,523

METHOD OF TREATING ORGANIC FABRIC

Alger L. Ward, Bala-Cynwyd, Pa., assignor to The United Gas Improvement Company, a corporation of Pennsylvania No Drawing. Application April 14, 1945, Serial No. 588,419

6 Claims. (Cl. 117—161)

The present invention relates to the coating, impregnating and/or locking of fabrics by applying thereto latices of rubber-like polymers of aliphatic conjugated pentadienes.

Natural rubber latex has, in the past, been employed for coating, impregnating and locking fibers in organic and inorganic fabrics such as woven, knitted, and felted fabrics made of fibrous materials such as cellulose, cotton, wool, silk, rayon, jute, hair, paper, fibrous glass, rock wool, asbestos and others.

As an example, among the important uses of natural rubber latex has been its employment as a locking and backing compound in the manufacture of carpets, rugs, upholstery and similar pile fabrics.

For many applications of this general character natural rubber latex is well suited, while for others it is not. Examples of the latter are its use on fibres such as wool from which all of the naturally occurring greases have not been removed, or on woven fabrics, upon the fibers of which lubricants had been applied. In such cases the aqueous latex dispersion did not satisfactorily "wet" the fibers. Various attempts were made to improve the "wetting" of such "greasy" fibers with different success. For example, a solvent such as xylene has been incorporated in the latex, with the idea that the solvent would permit the rubber to wet the greasy fiber.

Since natural rubber supplies have been curtailed, attempts have been made to substitute latices of synthetic rubber for natural rubber latex in the coating, impregnating and locking of fabrics. The synthetic rubber latex commonly available is that known commercially as GR-S, which is made from substantially pure butadiene and substantially pure styrene. Specifications for butadiene for GR-S rubber require it to be in concentration of 98.5% or higher and limit its content of peroxide and acetylenes to less than 0.001% and 0.01%, respectively. Specifications for styrene for GR-S rubber require a concentration of styrene of 99% or higer and limit the content of aldehydes, peroxides and sulfur to less than 0.03%, 0.01% and 0.03%, respectively.

As coating, impregnating and locking materials for fabrics, latices of GR-S rubber have proven considerably inferior to natural rubber. This is probably due to a considerable extent to the lack of "tack" which is a characteristic of GR-S rubber as compared to natural rubber.

Like natural rubber latices, latices of GR-S rubber are deficient in ability to wet greasy wool, and the addition of solvents to the latex does not satisfactorily solve the problem.

I have found that latices of rubber-like polymers of aliphatic conjugated pentadienes which in the same dispersed phase of the latex contain the rubber-like polymer and a soluble aromatic oil such as xylene are very valuable farbric coating, impregnating and locking materials having a very desirable "tack" and "wetting" ability.

I have found that such highly desirable latices of rubber-like polymer may be produced by the polymerization, with the aid of a rubber-likepolymer producing catalysts, such, for example, as tertiary butyl hydroperoxide of an aqueous emulsion having a dispersed phase comprising isoprene and/or piperylene and styrene and a soluble aromatic hydrocarbon such as xylene which is not polymerizable under the conditions obtaining.

The aliphatic conjugated pentadiene material may be copolymerized with other aromatic olefine material containing the styrene nucleus. Examples of such other aromatic olefine material are the nuclearly methylated styrenes, ortho methyl styrene, meta methyl styrene, and para methyl styrene.

When an aromatic hydrocarbon solvent, such for example, as xylene is added to a latex, the result is a three phase system in which water, as the continuous phase, separates two dispersed phases composed of solvent and polymer respectively. In such a system, the solvent is at best an inefficient aid in increasing the "wetting" ability and "tack" of the rubber.

When the reactive material comprising isoprene and/or piperylene and styrene and/or methyl styrene, is emulsified with water in the presence of a diluent aromatic hydrocarbon solvent, such, for example, as xylene, which is inert under the polymerization conditions, the result is a two phase system having water as the continuous phase and reactive material together with the diluent aromatic hydrocarbon solvent as the dispersed phase. On polymerization, the resulting latex is also a two phase system, having water as the continuous phase and the polymer and the diluent aromatic hydrocarbon solvent together as the dispersed phase.

In this latter case, the polymer and solvent are intimately associated instead of being separated by the continuous phase, and the characteristics of the polymer, such as "tack" and "wetting" ability, are efficiently modified and improved by the presence of the solvent.

The proportion of the diluent aromatic hydrocarbon solvent present in the dispersed phase of the finished latex may be controlled as desired by controlling the quantity of said diluent solvent present in the material emulsified and/or by the controlled removal of non-rubbery material from the latex after polymerization, for example, by subjecting the latex to a distillation operation, commonly termed "degassing."

Since the polymerization is rarely carried to completion, there will usually be also present in the latex, after polymerization, unpolymerized aliphatic conjugated diolefine material and unpolymerized aromatic olefine material, in proportion dependent upon the degree to which the polymerization is carried.

It is preferable to remove substantially all of the residual $C_5$ hydrocarbon material from the latex by distillation. Unpolymerized aromatic olefine material, such, for example, as monomeric styrene may be permitted to remain in the finished latex together with the diluent aromatic hydrocarbon solvent, such for example, as xylene.

When the diluent aromatic hydrocarbon solvent employed boils in the neighborhood of the boiling point of the aromatic olefine polymerized (as, for example, xylene boils in the neighborhood of the boiling point of styrene) the relative proportion of diluent aromatic hydrocarbon solvent and monomeric aromatic olefine material in the finished latex may be determined largely by the nature of the starting materials and the degree to which the polymerization is carried.

When the aromatic hydrocarbon solvent employed boils considerably higher than the aromatic olefine material polymerized, the relative proportion, in the latex, of unpolymerized aromatic olefine material to diluent aromatic hydrocarbon solvent may be also controlled by distilling off the monomeric aromatic olefine material to any desired degree, leaving any desired portion of the diluent aromatic hydrocarbon solvent in the latex.

The monomeric aromatic olefine material such, for example, as styrene is a good solvent for the rubber-like polymer and an efficient agent in imparting thereto desired characteristics of "tack" and wetting ability.

However, because of the tendency of such monomeric olefine material as monomeric styrene to polymerize with heat, it is preferred that its concentration in the latex be limited, and that it shall not exceed the concentration therein of diluent aromatic hydrocarbon solvent, such for example as xylene, which has no unsaturation outside of the benzene ring and which is not polymerizable under the usual conditions to which the latex is subjected in use. Preferably the proportion of such diluent aromatic hydrocarbon solvent exceeds the proportion of such monomeric aromatic olefine material in the polymer phase of the latex. For example, the presence in said dispersed phase of at least three parts of diluent aromatic hydrocarbon solvent, such as xylene to each two parts of monomeric aromatic olefine material such as styrene is preferred.

It is preferred that the total solvent aromatic hydrocarbon oil present in the same dispersed phase of the latex as the rubber-like polymer, including diluent aromatic hydrocarbon solvent and unpolymerized aromatic olefine material, if any, shall be between 5% and 30%, by weight, of the dispersed phase of the latex, with between 10% and 20% particularly preferred.

The quantity of the aromatic hydrocarbon solvent desired in the final latex will depend upon the particular raw materials polymerized, as well as upon the particular character of the latex desired for a particular employment.

When piperyline is present in considerable proportions in the starting material, the resulting rubber-like polymer has considerable "tack" due to the presence of polymerized piperylene therein. The quantity of the aromatic hydrocarbon solvent desired in the finished latex, in such case, may therefore depend, other things being equal, upon the relative proportions of piperylene to isoprene and other polymerizable material which may be in the starting material.

The diluent aromatic hydrocarbon solvent may be added to the polymerizable material before emulsification or may be originally present in the crude isoprene-piperylene distillates or in the crude aromatic olefine material, such as styrene mixed with xylene. Added diluent aromatic solvent material boiling between approximately 125° C. and 180° C. is preferred, particularly such material boiling between approximately 125° C. and 160° C.

I have found that light oil obtained in the manufacture of combustible gas and particularly light oil separated from products of the vapor phase pyrolysis of petroleum oil is a particularly desirable source of aliphatic conjugated pentadiene material, and also of styrene, or nuclearly methylated styrene for the production of latices of rubber-like polymer for the purposes of my invention.

I have found that superior latices, for fabric coating, impregnating and locking, may be produced from relatively crude light oil fractions, in which the reactants are in very much lower concentration and are very much more contaminated that the raw materials required for the production of GR-S rubber.

I have further found that the presence of diluent hydrocarbon material normally present in such light oil fractions, is an actual advantage in increasing the "wetting" ability and "tack" of the rubber-like polymer latex. The xylene present in light oil styrene fractions and the solvent naphtha present in light oil methyl styrene fractions are particularly desirable.

Readily obtainable light oil $C_5$ hydrocarbon fractions, which may be suitably employed in my invention are, for example, fractions in which aliphatic conjugated pentadiene material constitutes the preponderant portion of the fraction.

Concentration of $C_5$ light oil aliphatic material by fractional distillation alone, usually results in a fraction which contains a considerable proportion of cyclopentadiene, inasmuch as the boiling point of cyclopentadiene (about 40° C.) is close to and intermediate of the boiling points of isoprene (about 34° C.) and piperylene (about 42° C.).

It is preferred to restrict the presence of cyclopentadiene to less than 5%, by weight, of the conjugated diolefine material present, and preferably to less than 2%, by weight, such as below 1%, by weight.

Cyclopentadiene may be readily separated from mixtures containing the same together with isoprene and piperylene by the method described and claimed in my U. S. Patent 2,211,038, dated August 13, 1940, according to which cyclopentadiene in such a mixture is selectively dimerized to dicyclopentadiene, which may be readily separated from isoprene and piperylene by fractional distillation.

Examples of light oil fractions, of the kind described above, are fractions in which isoprene and/or piperylene is present in concentrations of from 50% to 100% by weight of the conjugated diolefine material present, for example in concentrations higher than 90% or 95% by weight of the total conjugated diolefine content.

In the preferred light oil fractions, aliphatic conjugated pentadiene material constitutes at least 25% by weight of the fraction, more preferably at least 40% or 50% thereof. Fractions containing between 60% and 80% of aliphatic conjugated pentadiene material are very suitable. The aliphatic conjugated pentadiene material preferably constitutes at least 50% by weight of the total content of unsaturated hydrocarbons in said fraction.

Particularly desirable are overall isoprene-piperylene fractions obtained by fractional distillation and, after removal of cyclopentadiene, containing at least 95% and preferably at least 97% by weight, of their conjugated diolefine content in the form of isoprene and piperylene, and containing isoprene in a concentration between 65% and 85%, by weight, of the total aliphatic conjugated pentadiene content thereof.

As examples of the boiling ranges such light oil fractions may have, the following are given: light oil isoprene-piperylene fractions boiling between 25° C. and 55° C., such as between 30° C. and 50° C.; light oil isoprene fractions boiling between 30° C. and 40° C.; and light oil piperylene fractions boiling between 37° C. and 47–50° C.

I have found very desirable, as coating, impregnating and locking materials, the copolymers of such C5 fractions with a fraction of light oil of the character above described, in which hydrocarbons or 8 carbon atoms per molecule have been concentrated in such manner, that styrene is the preponderant unsaturated hydrocarbon present, and is present in concentration between 30% and 80% by weight, the remaining material being chiefly in the form of a mixture of the isomeric xylenes, ortho xylene, meta xylene and para xylene. Light oil fractions containing between 50% and 80% by weight of styrene are especially suitable.

If desired, a wider light oil fraction may be employed containing considerable proportions of ring substituted methyl styrene, which may be in the form of a mixture of two or more of the isomers ortho methyl styrene, meta methyl styrene and para methyl styrene.

Further, if desired, there may be employed a light oil ring substituted methyl styrene fraction in which the preponderant portion of the unsaturated hydrocarbon content is methyl styrene and which contains between 30% and 80% by weight and preferably between 50% and 80% of methyl styrene.

As examples of the boiling ranges of such light oil styrene and methyl styrene fractions, the following are given: light oil styrene fractions boiling between 135° C. and 155° C.; light oil methyl styrene fractions boiling between 155° C. and 178° C.; and light oil styrene-methyl styrene fractions boiling between 135° C. and 178° C.

The ratio of pentadiene material to styrene and/or styrene homologue may be varied considerably such as from 2 to 1 to 4 to 1.

Known procedure may be employed for polymerization with respect to catalyst, emulsifying agents and other aids to emulsion stability such as protective colloids, dispersing agents, pH control and water dilution. Likewise known degasifying procedures may be employed to distill non-rubber-like material from the latex, leaving therein the desired proportions of aromatic hydrocarbon solvent.

Thus in forming the aqueous emulsion, prior to polymerization, usual procedures may be employed including the use of an emulsifying agent such as an alkali soap, for example, an alkali metal, ammonia or substituted ammonia salt of a higher fatty acid, or of a resin acid, such as pinic, sylvic, pinaric and abietic acids. Examples are ammonium, sodium, or potassium oleate, stearate, laurate, or myristate, potassium resinate, and triethanolamine laurate, to mention a few. Alkyl aryl sulfonates also may be employed.

It is also usual to employ a protective colloid such, for example as a gelatine or a casein material. Glue, such as bone glue and alkaline casein commonly known as proflex, are examples.

When a dispersing agent is employed, it is preferred to employ dispersing agents which are polymerized alkali metal salts of alkyl naphthalene sulfonic acids such, for example, as sodium salts thereof. "Alkyl" in the formula is intended to include one or more alkyl groups. Examples of alkyl groups are methyl, ethyl, propyl, butyl and amyl.

The dispersing agents known under the trade names "Darvan #1" and "Daxad #11" are polymerized sodium salts of alkyl naphthalene sulfonic acids.

The usual catalysts of the peroxide type may be employed such as, for example, benzoyl peroxide, hydrogen peroxide, lauroyl peroxide, tertiary-butylhydrogenperoxide and potassium persulfate.

Polymerization temperatures may be varied over a wide range, as may be the time of reaction depending upon the yield required. For a given yield, low temperatures have the disadvantage of requiring long times of polymerization. High temperatures have the disadvantage of developing relatively high pressures, while shortening the time required for a given yield.

Temperatures from 50° C. to 120° C. are given for example, with the range of temperatures from 70° C. to 110° C. representing a suitable compromise between time and pressure variables. Polymerization times from 8 to 72 hours are given for illustration, the shorter time being associated with relatively high polymerization temperature and vice versa.

The rubber-like polymers produced by the foregoing emulsion polymerization of aliphatic conjugated pentadiene material in the presence of styrene or methyl styrene are elastomers which have many of the characteristics of natural rubber. They form vulcanizates with the employment of the usual rubber vulcanizing agents, accelerators, etc. Like natural rubber they do not have a definite and reproducible softening point and are generally not compatible with drying oils. In these respects, they differ from resins produced by the relatively low temperature polymerization of aliphatic conjugated pentadiene material with the aid of an acid acting metallic halide catalyst or organic solvent complex thereof.

The following examples will further illustrate my invention.

*Example I*

A synthetic rubber latex was prepared as follows:

15 lbs. of bone glue were allowed to soak overnight in 100 pounds of water. 1100 lbs. of water were then added with agitation. To this mixture there were added, while continuing the agitation, 25 lbs. of "Darvan #1" and 17.5 lbs. of a butyl alcohol solution of tertiary butyl hydroperoxide of approximately 60% concentration and 3 lbs. of sodium hydroxide and 400 lbs. of a 20% soap solution. There was then added a mixture containing 600 lbs. of a light oil styrene fraction containing styrene and xylene and having a styrene content of approximately 61% and 1400 lbs. of a light oil pentadiene fraction from which the cyclopentadiene had been substantially completely removed and which had an aliphatic conjugated pentadiene content of approximately 61% with a ratio of isoprene to piperylene of approximately 3:1. Agitation was continued until a particle size of the dispersed phase of 1-15 microns was obtained. This mixture was then heated in an autoclave to approximately 100° C. with agitation for 9 hours under pressure. At the end of that period a smooth thick latex containing approximately 26% total solids content was obtained. The pressure was released, the latex was diluted with 368 pounds of water, and substantially all of the unpolymerized C₅ hydrocarbons contained in the latex, some of the water, and a portion of the C₈ hydrocarbons were removed by steam distillation. There were thus produced 2735 lbs. of a latex with a solids content of approximately 35% which contained styrene and xylene in the same dispersed phase with the rubber-like polymer and in combined proportion between 10% and 20% by weight of said dispersed phase. The relative proportion of xylene in the latex to monomeric styrene was higher than 2 to 1.

Throughout the polymerization the pH of the emulsion was above 10, as was also the pH of the resulting latex throughout the distillation.

The degassed latex obtained by the above procedure may be applied to fabrics without compounding. Preferably, however, it is compounded with a rubber vulcanizing agent, preparatory to the vulcanization of the coating after application. Other materials may be employed in compounding in a manner well known in the art, such as rubber vulcanization accelerators, antioxidants, and preservatives, fillers, extenders, plasticizers, pigments, etc.

As an illustration of compounding the following is given.

From a portion of the above degassed latex there was prepared a compounded latex containing approximately 31% total solids which was used in the coating, impregnating and locking of various types of textile fabrics. The final compounded latex was made up of the following different components.

| Component No. | Material | Pounds | Per cent |
|---|---|---|---|
| 1 | Isoprene-piperylene-styrene rubber latex | 975 | 63.4 |
| 2 | Bengal gum solution (1.7%) | 195 | 12.6 |
| 3 | Kaolin dispersion (60%) | 105 | 6.8 |
| 4 | Vulcanizing dispersion | 225 | 14.6 |
| 5 | Water | 40 | 2.6 |
| | Total | 1,540 | 100.0 |

The preparation of component 1 has been described above.

Component No. 2 was made up as follows:

| Material | Pounds | Per cent |
|---|---|---|
| Bengal gum | 3.3 | 1.7 |
| Ammonium hydroxide (28%) | 3.9 | 2.0 |
| Water | Balance | 96.3 |
| Total | 195 | 100.0 |

Component No. 3 was prepared by dispersing clay and consisted of the following:

| Material | Pounds | Per cent |
|---|---|---|
| Kaolin | 63 | 60.0 |
| "Darvan #1" | 1.25 | 1.2 |
| Ammonium hydroxide (28%) | 1.9 | 1.8 |
| Water | Balance | 37.0 |
| Total | 105 | 100.0 |

Component No. 4 was a portion of a vulcanizing dispersion which had been made up as follows:

| Constituent | Material | Pounds | Per cent |
|---|---|---|---|
| a | Water dispersion of sulfur containing 73% sulfur | 24.8 | 6.9 |
| b | Water dispersion of zinc oxide containing 50% of zinc oxide | 92.0 | 23.0 |
| c | Aqueous casein solution containing 12.5% casein | 206.00 | 51.5 |
| d | Aqueous dispersion of vulcanizing agents and anti-oxidants | 66.0 | 16.5 |
| e | Water | 11.2 | 2.1 |
| | Total | 400 | 100 |

Constituent c (of component No. 4) was made up as follows:

| Material | Pounds | Per cent |
|---|---|---|
| Casein | 25.75 | 12.5 |
| Ammonium hydroxide (28%) | 65.94 | 32.0 |
| Dowacide (sodium pentachlorophenate latex preservative) | 1.00 | 0.5 |
| Water | Balance | 55.0 |
| Total | 206.00 | 100.0 |

Constituent d (of component No. 4) was made up as follows:

| Material | Pounds | Percent |
|---|---|---|
| Captax (mercaptobenzothiazole accelerator) | 10.00 | 15.15 |
| Butyl zimate (accelerator) | 10.00 | 15.15 |
| AgeRite white (denaphthyl-p-phenylene diamine antioxidant) | 7.00 | 10.60 |
| Darvan #1 (dispersing agent) | 3.44 | 5.60 |
| Water | Balance | 53.50 |
| Total | 66.00 | 100.00 |

The compounded latex is applied to the reverse side of a wool pile fabric, by spreading on the foundation in order to firmly lock the pile thereto. The coated fabric is subjected to heating to distill off the water content of the latex as well as the diluent aromatic oil and to vulcanize the polymer.

*Example II*

A synthetic rubber latex is prepared by polymerizing an emulsion consisting of the following:

| Material | Parts |
|---|---|
| Isoprene (98.5%) | 60.0 |
| Styrene-xylene mixture containing 60% by weight of styrene | 67.0 |
| Soap (sodium oleate) | 4.0 |
| Bone glue | 0.75 |
| Tert. butyl hydroperoxide in butyl alcohol (60% concentration) | 0.88 |
| Sodium hydroxide | 0.15 |
| Ammonia (28%) | 1.0 |
| Water | 76.4 |
| "Darvan #1" | 1.5 |

After polymerization, the resulting latex is diluted with approximately 40 parts of water, the diluted latex having a water content equivalent to approximately 100% by weight of the hydrocarbon oil in the original emulsion.

The diluted latex is steam distilled to remove substantially all of the unpolymerized C₅ hydrocarbon material and a portion of the unpolymerized C₈ material to produce a finished latex in which the dispersed phase contains rubber-like polymer and C₈ aromatic hydrocarbon material chiefly in the form of xylene, said C₈ aromatic hydrocarbon material being present in proportion between 10% and 20%, by weight, of the dispersed phase.

The finished latex is compounded similarly to that of Example I and the compounded latex employed to impregnate a wool fabric by dipping the fabric in a bath of the latex and thereafter baking the impregnated fabric to dry and vulcanize the latex.

Example III

A synthetic rubber latex is prepared and compounded as in Example I except that the butyl zimate employed in Example I is replaced by an equal quantity of copper diethyl dithiocarbamate. To the compounding ingredients there is added a dispersion of carbon black in water. Such a dispersion is prepared by the suitable grinding of channel black in water containing "Darvan #1" until the particle size is less than 30 millimicrons. The pH is adjusted to that of the synthetic rubber latex prior to the addition of the black dispersion. Based on 975 pounds of the latex there are used 245 pounds of the black dispersion containing 85 pounds of carbon black.

The final compounded latex is employed in the backing and locking of textile fabrics for purposes for which color is not important (or a black color is desired) but which require the coating to have high tensile strength after vulcanization. For example, the compounded latex may be sprayed onto the reverse side of the fabric, which is thereafter heated to dry and vulcanize the latex.

The particular method of applying the latex to the fabric will vary with the fabric and the particular desired function of the latex.

The latex may be applied, for example, by any of the usual fabric treating methods, such as spreading, dipping or spraying.

For example, a strip of pile fabric may be passed continuously under a roller the lower portion of which is arranged below the surface of a bath of the latex contained in a trough, the pile side of the fabric being in contact with the roller and the foundation or reverse side of the fabric being in contact with the latex in the trough. On emergence from the trough the excess latex is removed from the foundation side of the fabric by doctor blades, the coated strip being thence passed continuously through a dryer in which the water content of the latex coating is distilled off together with the aromatic solvent, and the rubber-like polymer is vulcanized.

The viscosity of the latex employed should be such as to penetrate sufficiently into the fabric to provide, after drying and vulcanizing, an adequate anchor for the pile, without penetrating sufficiently to cause discoloration of the pile side of the fabric when the material is subjected to dyeing. The suitable viscosity varies with the particular fabrics treated.

The viscosity may be adjusted in known manner by the adjustment of the water content of the latex and by the employment of thickeners, such for example as Bengal gum.

As an example of procedure in anchoring wool pile fabric the following is given.

Example IV

A strip of wool pile fabric is passed continuously under an 8" diameter roller arranged to dip into a trough containing a compounded latex of rubber-like polymer similar to that produced in Example I, and having a viscosity relative to that of water between 3 and 4.

The pile side of the fabric is against the roller, so that the reverse side or foundation side of the fabric is contacted with the latex. The time the fabric is in contact with the bath of latex is usually very short, of the order of one second or less, but is not usually critical. The coated fabric, after leaving the trough, passes under doctor blades which scrape off excess latex and then passes continuously by conventional transmission apparatus through a drier. The transmission apparatus is arranged to provide for the accumulation of loops of fabric between the dipping roller and the dryer so that the dipping time and drying time may be varied somewhat independently of each other.

In the drier, the coated fabric is subjected to heating under temperature conditions between approximately 120° C. and 140° C. for a period of time between approximately 15 minutes and 30 minutes to evaporate the water and aromatic hydrocarbon oil content of the latex, and to vulcanize the rubber-like polymer.

From the drier, the fabric passes through conventional scouring and dyeing operations, and thence to stock or other disposal.

The viscosity of the latex relative to water may be determined by the following or equivalent procedure.

In a pint bottle graduated to 200 cc. and provided with a Bakelite screw top $\frac{1}{16}$" thick and having an orifice therethrough $\frac{1}{8}$" in diameter, is placed 200 cc. of the latex. The bottle is turned upside down, and the time required for all of the latex to flow through the orifice is determined.

The time required for 200 cc. of water to flow through the orifice is similarly determined. The ratio of the time required for 200 cc. of the latex to flow through the orifice to the time required for 200 cc. of water to flow through the orifice is employed as the viscosity of the latex relative to that of water.

By "fabric" is meant a woven, felted, or knitted material and the materials used in its making. The term includes textile fabrics such as cotton, wool, silk, and rayon textiles, felted fabrics such as wool, fur, and hair felt and paper as well as including the materials making up such fabrics such as cotton, wool, silk, and rayon threads and fibers, as well as hair and paper fibers.

In connection with the emulsion employed herein and its production reference is made to co-pending application Serial No. 585,189, filed March 27, 1945, by Raymond A. Franz now abandoned.

I claim:

1. In a process for treating organic fabric having fibers which are greasy the step of applying to said fibers a latex comprising water as the continuous phase and having as the dispersed phase rubber-like copolymer of aliphatic conjugated C₅ diolefine material selected from the group consisting of isoprene and piperylene and mixtures of them and aromatic olefine material selected from the group consisting of styrene and methyl styrene and mixtures of them and aromatic hydrocarbon solvent for said polymer, in the latex the polymers of the dispersed phase being present in a proportion of about 31% to 35% of the said latex and the solvent being present in a proportion of about 5% to 30% of the total dispersed phase, said latex when applied to said fabric containing in the same dispersed phase said rubber-like polymer dissolved in said aromatic solvent.

2. In a process for treating organic fabric having fibers which are greasy the step of applying to said fibers a latex comprising water as the continuous phase and having as the dispersed phase rubber-like copolymer of aliphatic conjugated $C_5$ diolefine material selected from the group consisting of isoprene and piperylene and mixtures of them and aromatic olefine material selected from the group consisting of styrene and methyl styrene and mixtures of them and aromatic hydrocarbon solvent for said polymer, in the latex the polymers of the dispersed phase being present in a proportion of about 31% to 35% of the said latex and the solvent being present in a proportion of 10% to 20% of the total dispersed phase, said latex when applied to said fabric containing in the same dispersed phase said rubber-like polymer dissolved in said aromatic solvent.

3. In a process for treating organic fabric having fibers which are greasy the step of applying to said fibers a latex comprising water as the continuous phase and having as the dispersed phase rubber-like copolymer of isoprene and aromatic olefine material selected from the group consisting of styrene and methyl styrene and mixtures of them and aromatic hydrocarbon solvent for said polymer, in the latex the polymers of the dispersed phase being present in a proportion of about 31% to 35% of the said latex and the solvent being present in a proportion of about 5% to 30% of the total dispersed phase, said latex when applied to said fabric containing in the same dispersed phase said rubber-like polymer dissolved in said aromatic solvent.

4. In a process for treating organic fabric having fibers which are greasy the step of applying to said fibers a latex comprising water as the continuous phase and having as the dispersed phase rubber-like copolymer of isoprene and aromatic olefine material selected from the group consisting of styrene and methyl styrene and mixtures of them and aromatic hydrocarbon solvent for said polymer, in the latex the polymers of the dispersed phase being present in a proportion of about 31% to 35% of the said latex and the solvent being present in a proportion of about 10% to 20% of the total dispersed phase, said latex when applied to said fabric containing in the same dispersed phase said rubber-like polymer dissolved in said aromatic solvent.

5. In a process for treating organic fabric having fibers which are greasy the step of applying to said fibers a latex comprising water as the continuous phase and having as the dispersed phase rubber-like copolymer of piperylene and aromatic olefine material selected from the group consisting of styrene and methyl styrene and mixtures of them and aromatic hydrocarbon solvent for said polymer, in the latex the polymers of the dispersed phase being present in a proportion of about 31% to 35% of the said latex and the solvent being present in a proportion of about 5% to 30% of the total dispersed phase, said latex when applied to said fabric containing in the same dispersed phase said rubber-like polymer dissolved in said aromatic solvent.

6. In a process for treating organic fabric having fibers which are greasy the step of applying to said fibers a latex comprising water as the continuous phase and having as the dispersed phase rubber-like copolymer of piperylene and aromatic olefine material selected from the group consisting of styrene and methyl styrene and mixtures of them and aromatic hydrocarbon solvent for said polymer, in the latex the polymers of the dispersed phase being present in a proportion of about 31% to 35% of the said latex and the solvent being present in a proportion of about 10% to 20% of the total dispersed phase, said latex when applied to said fabric containing in the same dispersed phase said rubber-like polymer dissolved in said aromatic solvent.

ALGER L. WARD.

REFERENCES CITED

The following references are of record in the file of this patent:

UNITED STATES PATENTS

| Number | Name | Date |
|---|---|---|
| 2,257,139 | Tone | Sept. 30, 1941 |
| 2,259,496 | Soday | Oct. 21, 1941 |
| 2,296,427 | Daniel et al | Sept. 22, 1942 |
| 2,317,858 | Soday | Apr. 27, 1943 |
| 2,340,358 | Young | Feb. 1, 1944 |
| 2,374,602 | Kienle et al. | Apr. 24, 1945 |